United States Patent [19]

Morinaga

[11] Patent Number: 4,566,650
[45] Date of Patent: Jan. 28, 1986

[54] EMERGENCY-LOCKING TYPE RETRACTOR PROVIDED WITH A TAKE-UP FORCE LOCKING MECHANISM

[75] Inventor: Masaru Morinaga, Yamato, Japan
[73] Assignee: NSK-Warner K. K., Tokyo, Japan
[21] Appl. No.: 515,131
[22] Filed: Jul. 19, 1983
[30] Foreign Application Priority Data Jul. 30, 1982 [JP] Japan .................. 57-114735[U]

[51] Int. Cl.⁴ .................. A62B 35/02; B65H 75/48
[52] U.S. Cl. .................. 242/107.4 A; 242/107.4 B; 242/107.6
[58] Field of Search .............. 242/107.4 B, 107.6, 242/107.4 A; 280/806, 807; 297/478

[56] References Cited

U.S. PATENT DOCUMENTS

| | | | |
|---|---|---|---|
| 3,482,799 | 12/1969 | Wrighton et al. | 242/107.4 B |
| 3,883,089 | 5/1975 | Close | 242/107.4 B |
| 4,349,164 | 9/1982 | Naitoh | 242/107.4 B X |
| 4,373,684 | 2/1983 | Naito | 242/107.6 |
| 4,386,745 | 6/1983 | Patel et al. | 242/107.4 B |
| 4,392,620 | 7/1983 | Takada | 242/107.4 B |
| 4,393,995 | 7/1983 | Tukamoto | 242/107.4 B |
| 4,445,648 | 5/1984 | Bloch | 242/107.4 B X |

Primary Examiner—John M. Jillions
Attorney, Agent, or Firm—Shapiro and Shapiro

[57] ABSTRACT

A retractor has a reel biased in a belt take-up direction and rotatably supported by a base member, and a belt take-up force locking mechanism capable of assuming a position in which it is interlocked with rotation of the reel and a position in which it is non-interlocked with rotation of the reel. The belt take-up force locking mechanism is adapted, when it assumes the interlocked position, to move from and towards its initial interlocked position in response to rotation of the reel and prevent take-up of the portion of the belt already drawn out. An emergency-locking mechanism provided for sensing at least a draw-out speed change of the belt above a predetermined value and connecting the reel to the base member to prevent rotation of the reel in a belt draw-out direction. The emergency-locking mechanism is adapted, when the belt take-up force locking mechanism is in its initial interlocked position to prevent undesired lock-up of the retractor but to operate properly in an emergency.

3 Claims, 8 Drawing Figures

FIG. 6
FIG. 8
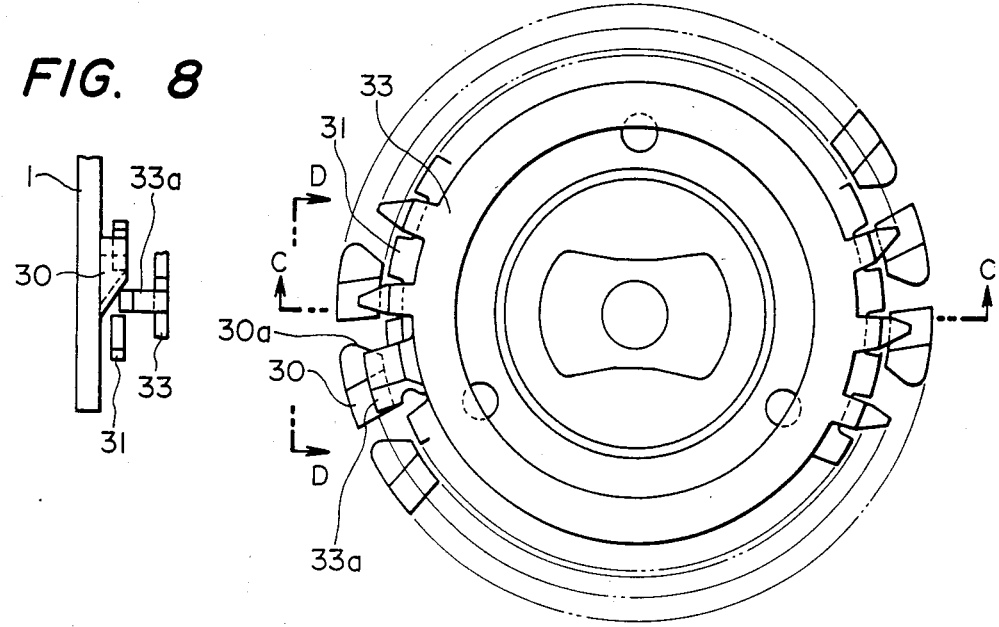
FIG. 7
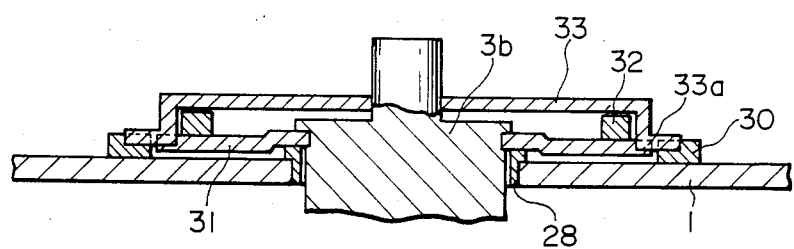

EMERGENCY-LOCKING TYPE RETRACTOR PROVIDED WITH A TAKE-UP FORCE LOCKING MECHANISM

BACKGROUND OF THE INVENTION

1. Field of the Invention

This invention relates to an emergency-locking type retractor provided with a take-up force locking mechanism, and in particular to an emergency-locking type retractor in which an emergency-locking mechanism is kept from operating when the take-up force locking mechanism is in an initial position, but is capable of operating in an emergency.

2. Description of the Prior Art

In a retractor provided with a take-up force locking mechanism having a predetermined operation range and an emergency-locking mechanism (particularly, one which senses a belt draw-out speed change above a predetermined value and locks draw-out of a belt), if the belt is drawn out when the take-up force locking mechanism is in an initial operative position and is then quickly rewound, when the take-up force locking mechanism has returned to its initial operative position, belt take-up is abruptly prevented and the great deceleration of the retractor reel causes the emergency-locking mechanism to operate. There is thus produced, in this initial operative position of the retractor a locked up condition in which the belt cannot be re-drawn out and at the same time rotation of the reel in a rewind direction becomes impossible due to operation of the take-up force locking mechanism. In such a state, the belt cannot move in any direction, which is inconvenient and unsafe.

SUMMARY OF THE INVENTION

Accordingly, the present invention has as its object to provide an emergency-locking type retractor provided with a take-up force locking mechanism having a construction which prevents such a situation from occurring.

The invention will become fully apparent from the following detailed description thereof taken in conjunction with the accompanying drawings.

BRIEF DESCRIPTION OF THE DRAWINGS

FIG. 6 illustrates the operation.

FIG. 7 is a cross-sectional view taken along line C—C of FIG. 6.

FIG. 8 is a view taken along line D—D of FIG. 6.

DESCRIPTION OF THE PREFERRED EMBODIMENT

An embodiment of the present invention will hereinafter be described.

Figure 1:
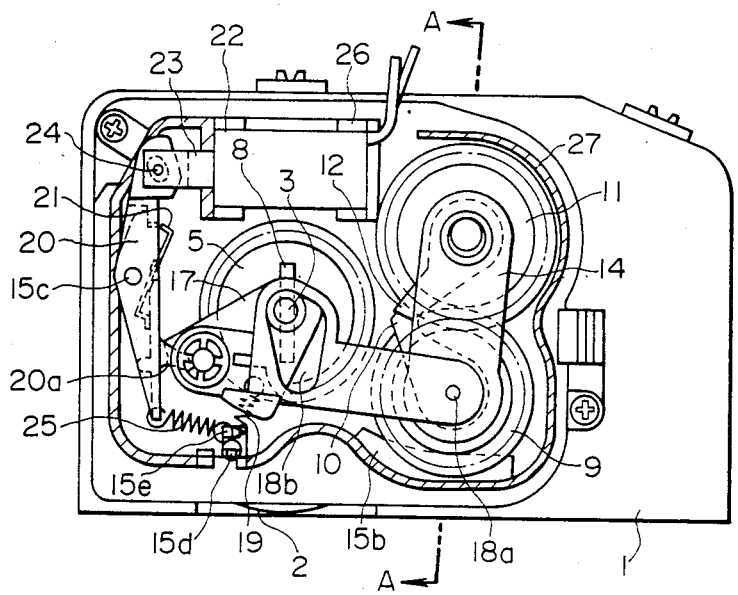
FIG. 1 is a front view of an embodiment of the present invention.

In FIGS. 1 to 4, a base member of a retractor has two opposed side plate portions 1 (only one of which is seen in FIG. 1) and a base portion 2 extending therebetween. Reel shaft means 3 is rotatably supported between the side plate portions 1 and is biased in a counter-clockwise direction as viewed in FIG. 1, which is the belt take-up direction, by a belt take-up spring 4 (FIG. 4) on a side plate portion 1.

Figure 4:
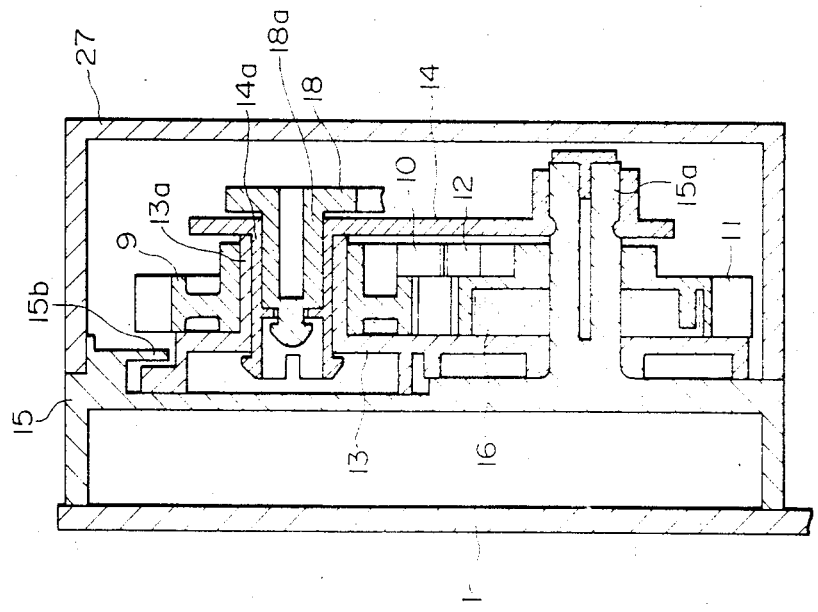
FIG. 4 is a cross-sectional view taken along line B—B of FIG. 2.

As shown in FIG. 4, a main gear 5 is mounted on one end of the shaft means 3 in such a manner that it is rotatable with the shaft means. A conical spring 6 is provided between the main gear 5 and a shoulder formed on the shaft of the reel shaft means 3 and urges a horned disc 7 against the back of the main gear 5 with a suitable force. The main gear 5 is mounted on the reel shaft means 3 by means of a shear pin 8.

Figure 3:
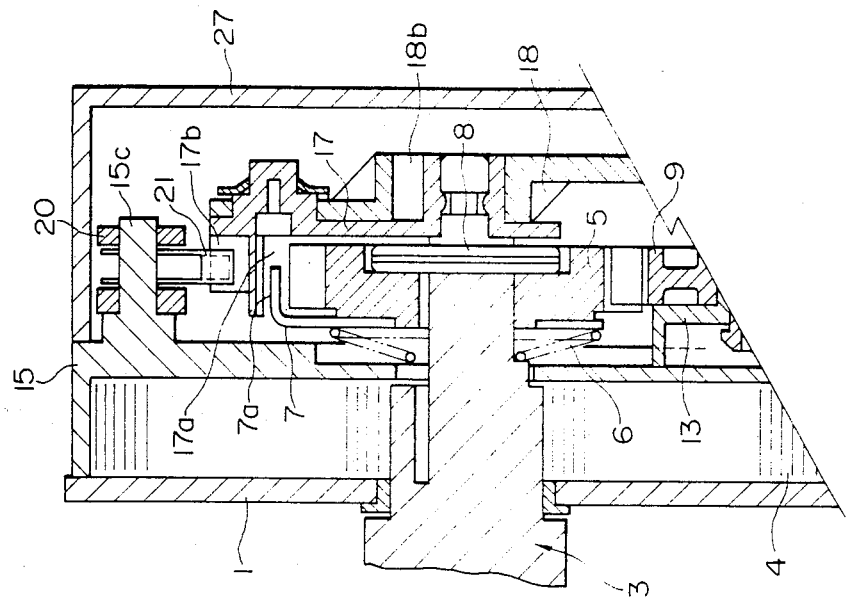
FIG. 3 is a cross-sectional view taken along line A—A of FIG. 1.

Take-up force locking means has an idle gear 9 movable between a position in which it meshes with the main gear 5 and a position in which it does not mesh with the main gear 5, a first cam 10 integral with the idle gear 9 and extending radially, a stop gear 11 in mesh engagement with the idle gear 9, and a second cam 12 integral with the stop gear 11 and extending radially. As shown in FIG. 3, the idle gear 9 is mounted between a shifter 13 and a fastening plate 14 while being rotatably fitted on the cylindrical portion 13a of the shifter 13, and the stop gear 11 is also mounted between the shifter 13 and the fastening plate 14 while being rotatably fitted on the shaft portion 15a of the lower cover 15 of the take-up spring 4.

In the present embodiment, to prevent tooth skipping and tooth breakage, the lower cover 15 is formed with a portion 15b for preventing the floating of the shifter 13.

The lower portion of the stop gear 11 provides a cup portion which contains a return spring 16 therein, and the return spring biases the stop gear 11 counter-clockwise as viewed in FIG. 1, whereby whenever the take-up locking means is not in mesh engagement with the main gear 5, the first cam 10 and the second cam 12 may bear against each other in the position of FIG. 1 and the two gears 9 and 11 may be in a first mutual rotation preventing position shown in FIG. 1. Another mutual rotation preventing position is realized when the two gears 9 and 11 are rotated from their positions of FIG. 1 counter-clockwise and clockwise, respectively, as viewed in FIG. 1 and the cams 10 and 12 cause positional deviation during each rotation due to the difference in number of teeth between the gears 9 and 11, whereby the cams 10 and 12 come to a position substantially symmetric with the position of FIG. 1 with respect to a line passing through the centers of the gears 9 and 11. In this second mutual rotation preventing position, the gears 9 and 11 are not rotatable counter-clockwise and clockwise, respectively, as viewed in FIG. 1.

A lever 18 forming a toggle link mechanism with a link arm 17 has a pivot pin portion 18a at one end thereof loosely mounted in the cylindrical portion 14a of the fastening plate 14. The lever 18 also has at an intermediate portion thereof a lever rotation range limiting slot 18b receiving the outer end of the reel shaft means 3 therein and at the other end thereof is turning-pair-connected to the link arm 17. The link arm 17 is pivotably connected to the outer end of the reel shaft means 3.

The inner side surface of the link arm 17 is formed with a sector-shaped depression 17a having a predetermined central angle and receiving the horn portion 7a of the disc 7 therein, and is formed with a lower projection 17b which performs a function to be described.

Such a toggle link mechanism always tries to assume the position of FIG. 1 by being biased by a coil spring 19.

A trigger member 20 is pivotally mounted about a shaft portion 15c formed on the lower cover 15, and a lever hook spring 21 projecting outwardly as shown in FIG. 1 to engage the lower projection 17b of the link arm 17 is contained in an internal hollow portion of the trigger member. One end of the trigger member 20 is coupled to the plunger 23 of a solenoid assembly 22 by a spring pin 24, and a coil spring 25 is secured to the other end of the trigger member 20, whereby the trigger member is biased counter-clockwise as viewed in FIG. 1. The trigger member 20 has a pawl portion 20a for engaging the lower projection 17b of the link arm 17.

The solenoid assembly 22 is fixed to a mounting portion 26 coupled to the lower cover 15, and when the solenoid assembly is energized, the plunger 23 is attracted. Projections 15d and 15e to which springs 19 and 25 are secured are formed integrally with the lower cover 15, eliminating the need for fixing these springs to the lower cover 15 and accordingly, improving productivity.

A cover 27 for covering the above-described elements is fixed to the lower cover 15. Screws or the like need not be used to fix the cover 27, and this also improves productivity.

The emergency-locking mechanism portion of the present embodiment will now be described by reference to FIGS. 5 to 8. As shown in the exploded perspective view of FIG. 5, this portion is provided on the side plate portion 1 opposite to that side on which the take-up force locking mechanism is provided. The aforementioned reel shaft means 3 has its shaft 3b passed through a bobbin 3a, and a belt W is mounted in a groove portion formed therein and is retained by a rod 3c. The reel shaft means 3 is supported by circular holes 1a and 1b formed in the side plates 1, through bearings 28 and 29. The axial movement of the reel shaft means is restricted by a stop ring, not shown.

A plurality of (fifteen in FIG. 5) equally spaced apart locking projections 30 are formed around the circular hole 1a of the side plate portion 1 on this side of the base member, and the side of each of these projections 30 in the direction of clockwise rotation provides a latch surface 30a. A latch plate 31 is mounted on the outer end of the shaft 3b for rotation therewith, and the same number of latch teeth 31a as the projections 30 are formed in equally spaced apart relationship on the outer periphery of the latch plate 31. On the further outer portion of the shaft 3b beyond the latch plate 31, a latch-up spring 32, a latch ring 33, a latch frame 35 having a sensor spring 34 attached thereto, and a sensor ratchet 36 are loosely fitted by a set pin 37. The latch ring 33 is axially movable and biased outwardly by the latch-up spring 32, and the axially extending portion of each of the L-shaped teeth 33a of the latch ring 33 is always in mesh engagement with the latch plate 31. The number of the teeth 33a is twelve, and totals fifteen when protrusions 33b formed at an interval of 120° and engaged with the cam surface 35a of the latch frame 35 are added thereto.

The sensor spring 34 has a plate-like shape and has a portion 34a of great rigidity and a portion 34b of small rigidity, and the ends 34c and 34d thereof are attached to the pin portions 35b and 35c of the latch frame 35. The sensor spring 34 enters the inner side of the latch frame 35 through the window portion 35d thereof and extends in such a manner that it bypasses the shaft 3b. The junction between the portions 34a and 34b of the sensor spring 34 is adapted to coincide with the cut-away portion 35e of the latch frame 35. A lock piece 38 is rotatably mounted here and, when the sensor spring 34 is deformed to cause the lock piece 38 to project from the cut-away portion 35e, it is adapted to mesh with the internal teeth 40 of a sensor cover 39 secured to the side plate portion 1. The sensor spring 34 also has a bent portion 34e which extends through the hole 35f of the latch frame 35 into one of the window portions 36a of the sensor ratchet 36 as an inertia member. This bent portion 34e normally bears against the right end of the hole 35f of the latch frame due to the spring force of the sensor spring 34.

A support 41 is secured to the lower portion of the side plate portion 1. A weight 42 is placed in a hollow portion of the support 41 and a ratchet lever 43 having a projection 43a and a latch portion 43b is rockably mounted on the weight 42. A support cover 44 is attached to the support 41. When the weight 42 is inclined and the ratchet lever 43 rocks upwardly, the latch portion 43b of the ratchet lever is adapted to mesh with one of the teeth 36b of the sensor ratchet 36.

In the above-described embodiment, the number of teeth of the main gear 5 of the take-up force locking mechanism is substantially the same as the number of teeth of the latch ring of the emergency-locking mechanism, that is, the number of teeth of the main gear 5 is fifteen and the number of teeth of the latch ring 33 is twelve which is smaller than fifteen by the number of protrusions 33b. Thus, in a position in which the take-up force locking mechanism is operable, that is, a position in which the main gear 5 can mesh with the idle gear 9, even if the latch ring 33 moves axially inwardly, the radially extending portions of the teeth 33a of the latch ring strike against the top portions of the projections 30 and do not mesh therewith. In other words, the take-up force locking mechanism and the emergency-locking mechanism are synchronized with each other as described above.

The operation of the present embodiment will hereinafter be described on the basis of the abovedescribed construction. The take-up force locking mechanism will first be described.

When a person who wishes to wear the belt draws out the belt from the retractor, the reel shaft means rotates clockwise as viewed in FIG. 1. At this time, the disc 7 also begins to rotate clockwise, but the horn portion 7a bears against the upper end of the depression 17a of the link arm 17 as viewed in FIG. 1 to rotate the link arm somewhat clockwise, whereupon the lower projection 17b of the link arm becomes engaged with the pawl portion 20a of the trigger member 20, whereby the clockwise rotation of the disc 7 is stopped and only the reel shaft means 3 and the main gear 5 rotate while sliding friction is created between the disc 7 and the main gear 5.

If a tang (not shown) is inserted into the buckle (not shown) of the seat belt when the belt has been drawn out by a suitable length, a buckle switch (not shown) is operated and power is supplied to the solenoid assembly 22 and thus, the plunger 23 is attracted. However, when the tang is inserted while the belt is being drawn out, the pawl portion 20a of the trigger member 20 is in mesh engagement with the lower projection 17b of the link arm 17 and therefore, even if the plunger 23 is attracted, the trigger member 20 cannot rotate clockwise as viewed in FIG. 1.

Excess belt drawn out is taken up by the take-up spring (the belt fits to the body), and the disc 7 is rotated counter-clockwise with the reel shaft means 3. The lever 18 and the link arm 17 are also rotated counter-clockwise by the return spring 19, disengaging projection 17b from pawl portion 20a and permitting the trigger member 20 to rotate clockwise. The trigger member 20 cannot be rotated clockwise by the solenoid assembly in its attracting condition until the pawl portion 20a of the trigger member becomes disengaged from the lower projection 17b of the link arm. The position in which the trigger member has been rotated clockwise is shown in FIG. 2.

Thereafter, the disc 7 is again rotated clockwise with the reel shaft means 3 when the belt is again drawn out by the forward leaning of the upper part of the belt wearer or by the hand of the belt wearer. The disc is rotated by a predetermined angle governed by the central angle of the sector-shaped depression 17a of link arm 17, and the angle is determined so as to provide ideal slack to a portion of the belt. Then the lever 18 and the link arm 17 are also rotated clockwise. The trigger member 20 has already rotated clockwise and therefore, the clockwise rotation of the lever and the link arm caused by the disc 7 is not prevented by the pawl portion 20a. The lower projection 17b of the link arm 17 causes the lever hook spring 21 installed in the trigger member to flex and rides onto this spring. The lever and the link arm rotate clockwise until the edge of the slot 18b of the lever 18 bears against the end of the reel shaft means 3 (see FIG. 2). Then the lever 18 and the link arm 17 toggle and rotate the shifter 13 clockwise as viewed in FIG. 2, thereby establishing mesh engagement between the main gear 5 and the idle gear 9. The manner in which the take-up force locking means and the reel shaft means thus assume an interlocked condition is shown in FIG. 2.

Figure 2:
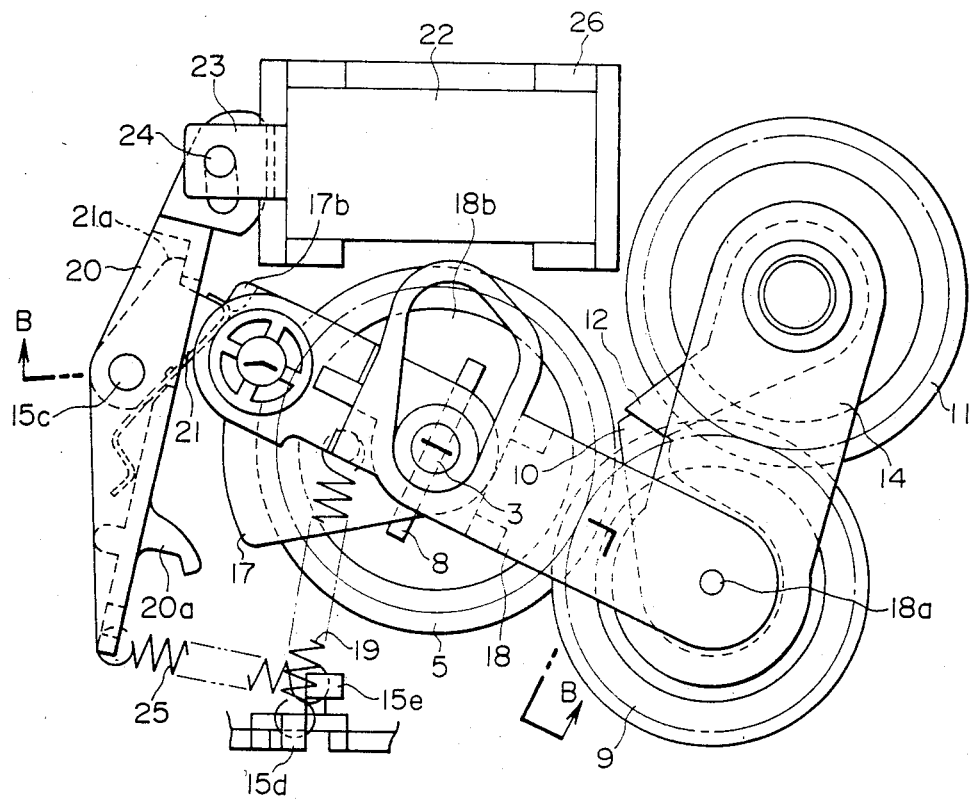
FIG. 2 illustrates the operation.

In the position of FIG. 2, the rotation of the reel shaft means 3 in counter-clockwise direction, which is the belt take-up direction, is restricted by the cams 10 and 12 and therefore, the force of the take-up spring does not act on the belt. However, clockwise rotation of the reel shaft means 3 in the belt draw-out direction is possible until the cams 10 and 12 come to the aforementioned second mutual rotation preventing position. This degree of draw-out of the belt is adjusted by suitably determining the ratio of the number of teeth among the three gears 5, 9 and 11.

In the position of FIG. 2 the link arm 17 cannot return counter-clockwise, because hook spring 21 engages projection 17b and blocks return movement of the link arm. Stop portion 21a sets the blocking position of the hook spring as shown in FIG. 2.

Thus, in the belt wearing condition, ideal slack is reliably set and the belt take-up force is zero and also, draw-out or take-up of the belt is possible in a suitable range from the belt wearing position.

When the tang is disengaged from the buckle, the buckle switch opens to stop the supply of power to the solenoid assembly 22, and the trigger member 20 is returned to its original position by the force of the return spring 25 and simultaneously therewith, the toggle link mechanism is also returned to its original position by the force of the return spring 19. Accordingly, the mesh engagement between the main gear 5 and the idle gear 9 is released and the whole amount of the drawn-out belt is taken up by the restored force of the take-up spring.

The operation of the emergency-locking mechanism will now be described. When a speed change above a predetermined value occurs to the vehicle body, the weight 42 becomes inclined and accordingly, the ratchet lever 43 rocks upwardly. Simultaneously therewith, the belt W is drawn out and the shaft 3b rotates counter-clockwise as viewed in FIG. 5. Accordingly, the ratchet lever 43 comes into mesh engagement with the sensor ratchet 36 to stop the rotation of the latter. The latch frame 35 and the sensor spring 34 try to rotate with the shaft 3b through the intermediary of the latch-up spring 32 and the latch ring 33 and therefore, a phase difference occurs between the latch frame 35 and the sensor ratchet 36. Since the bent portion 34e of the sensor spring 34 is in a window portion 36a of the sensor ratchet 36, the bent portion 34e is caused to move leftward in hole 35f of latch frame 35 as viewed in FIG. 5. The distortion of spring 34 thus causes lock piece 38 attached to the spring 34 to move outwardly through the cut-away portion 35e of the latch frame 35. (For purposes of illustration, lock piece 38 has been shown over-size relative to cut-away portion 35e.) Consequently, the lock piece 38 comes into mesh engagement with one of the internal teeth 40 of the sensor cover 39 to stop rotation of the latch frame 35. At this time, the latch ring 33 tries to continue to rotate counter-clockwise with the shaft 3b through the intermediary of the latch-up spring 32 and therefore, the protrusion 33b thereof is guided and moved axially inwardly by the cam surface 35a of the latch frame 35 and hence the latch ring 33 is guided and moved axially inwardly of the teeth 31a of the latch plate 31 against the biasing force of the spring 32. In this manner, the teeth 33a of the latch ring 33 come into mesh engagement with the latch surfaces 30a of the projections 30 of the side plate portion 1, whereby the rotation is stopped. Accordingly, the side plate portion 1 and the latch plate 31 are connected together by the latch ring 33 to stop rotation of the shaft 3b.

This also holds substantially true of the webbing speed sensing mechanism. When the belt W is rapidly drawn out, the shaft 3b, the latch ring 33, the latch frame 35 and the springs 32, 34 try to rotate together with one another, but the sensor ratchet 36 lags due to inertia, whereby a phase difference occurs between the sensor ratchet 36 and the latch frame 35. Thereafter, the same process as in the vehicle body sensing type device is followed and rotation of the shaft 3b is stopped.

Figure 5:
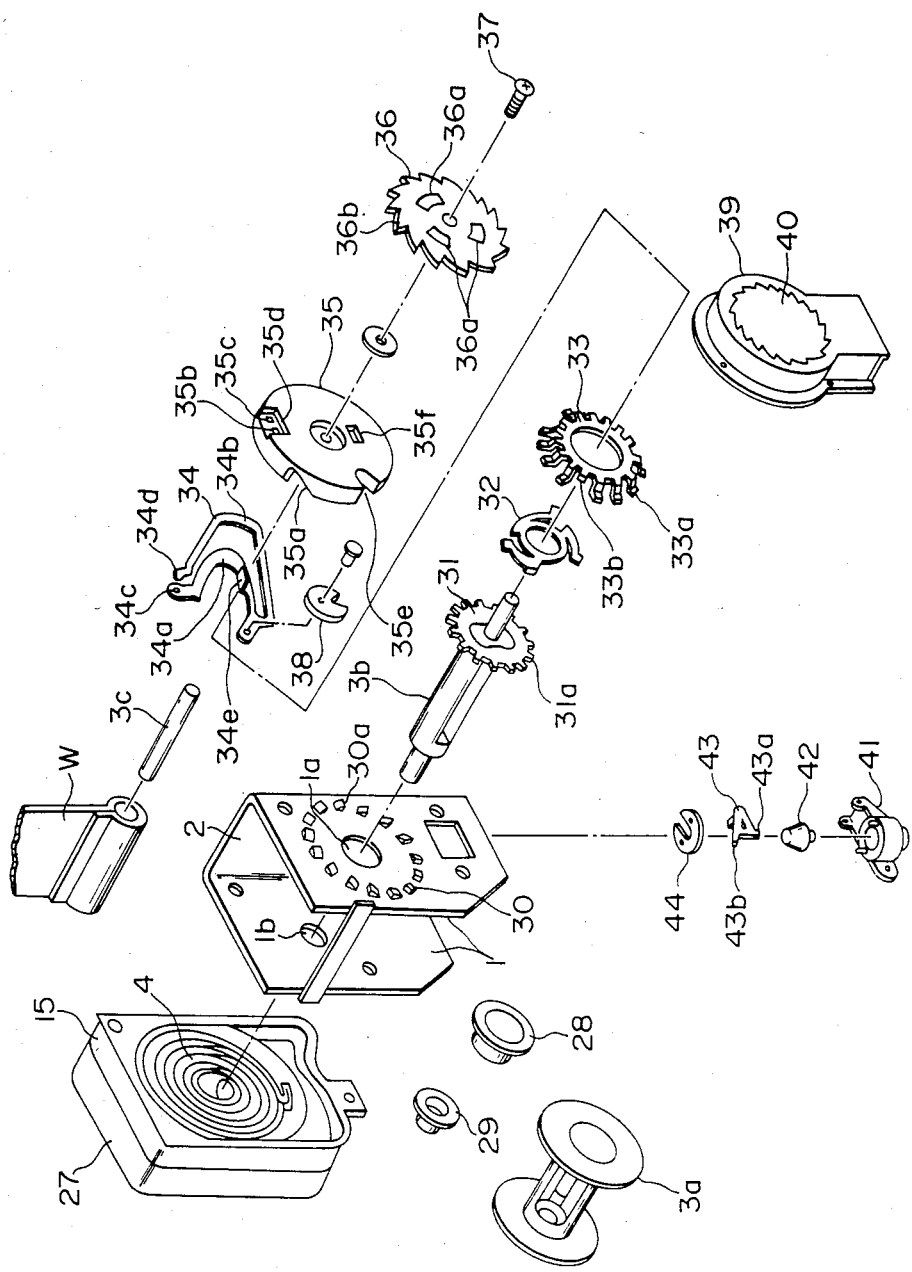
FIG. 5 is an exploded perspective view of portions of the embodiment of the present invention.

Now, assume a case where the belt W is drawn out when the take-up force locking mechanism is operating as shown in FIG. 2, and then the draw-out force is eliminated and the belt is rewound somewhat by the force of the take-up spring 4 (shaft 3b rotating clockwise as viewed in FIG. 5 to rewind the belt). The belt suddenly stops when the take-up force locking mechanism comes to the initial operative position of FIG. 2. Even though the shaft 3b suddenly stops at this time, the latch frame 35 tries to continue to rotate in the take-up direction (clockwise as viewed in FIG. 5) due to inertia. Accordingly, the latch ring 33 is pushed axially inwardly by movement of protrusion 33b along the cam surface 35a, and the teeth 33a try to mesh with the projections 30 on the side plate portion 1. Unless the shaft 3b rotates in the draw-out direction, the latch ring 33 is again pushed outwardly by the force of the latch-up spring 32 and thus, there is no problem. However, ignoring the invention for the moment, when the position of FIG. 2 is reached, the main gear 5, the idle gear 9, the stop gear 11, the first cam 10 and the second cam 12 are resiliently deformed in the initial operative position either by the reaction resulting from the first cam 10 striking against the second cam 12 or by shock, and the shaft 3b tries to rotate somewhat in the draw-out direction due to restoration rebound from the deformation, and this causes a problem. That is, a short time before the latch ring 33 is pushed outwardly by the spring 32, the teeth 33a of the latch ring 33 are pushed against the latch surfaces 30a of the projections 30 to cause the latch ring 33 to tightly mesh with the projections 30 and thus, the belt can move neither in the draw-out direction nor in the rewind direction in the initial operative position of the take-up force locking mechanism.

In the present invention, however, when the take-up force locking mechanism is operating and has returned to its initial operative position (FIG. 2), even if the latch ring 33 is pushed axially inwardly due to the inertia action of the latch frame 35 as previously described, the teeth 33a come to the inclined surfaces opposite to the latch surfaces 30a of the projections 30 as shown in FIGS. 6 to 8 and therefore cannot mesh with the projections 30 and thus, such a problem does not occur. More particularly, the phase relationship between the teeth 33a and the projections 30 is so set that the teeth 33a cannot mesh with the projections 30 when the take-up force locking mechanism takes its initial operative position.

When a speed change above a predetermined value occurs to the vehicle body in the initial operative position of the take-up force locking mechanism, or the belt is suddenly drawn out, the emergency-locking mechanism operates as previously described, but in such case, the reel shaft means 3 is somewhat rotated in the belt draw-out direction and the teeth 33a of the latch ring 33 are in a position in which they can mesh with the projections 30 of the side plate portion 1 and thus, no problem occurs.

Although the present invention has so far been described with respect to an embodiment thereof, the construction of the take-up force locking mechanism and the construction of the emergency-locking mechanism are not restricted thereto, but as regards the former, the present invention is applicable to any mechanism in which the belt can be drawn out and rewound from the initial operative position as disclosed, for example, in U.S. Pat. No. 4,023,746 or No. 4,270,709, and as regards the latter, the present invention is applicable to any mechanism having a construction in which, as disclosed, for example, in U.S. Pat. No. 3,979,083 or No. 4,228,970, a certain engaging member is present and by movement thereof, the reel shaft means is connected or non-connected to the base member.

According to the present invention, as described above, the problem of undesired lock-up in a retractor having a take-up force locking mechanism and an emergency-locking mechanism is solved by a simple construction.

I claim:

1. A retractor having reel shaft means biased in a belt take-up direction and rotatably supported by a base member, a belt take-up force locking mechanism capable of assuming an initial operative position in which the rotation of said reel shaft means in the belt take-up direction is prevented while rotation of said reel shaft means in a belt draw-out direction is allowed, the reel shaft means tending to rotate in the belt draw-out direction in reaction to return of the belt take-up force locking mechanism to its initial operative position after it has been moved from its initial operative position by the rotation of the reel shaft means in the belt draw-out direction, an emergency-locking mechanism for sensing at least one of a draw-out speed change of the belt above a predetermined value and a vehicle speed change above a predetermined value and for connecting said reel shaft means to said base member to prevent the rotation of said reel shaft means in the belt draw-out direction, said emergency-locking mechanism including a first means which moves due to its inertia upon said return of the belt take-up force locking mechanism to its initial operative position, and a second means responsive to said movement of said first means for attempting to connect the reel shaft means to the base member, and means for preventing said second means from connecting the reel shaft means to the base member upon said return of the take-up force locking mechanism to its initial operative position.

2. A retractor according to claim 1, wherein said take-up force locking mechanism is capable of assuming an operative condition in which it is interlocked with rotation of said reel shaft means and a non-operative condition in which it is non-interlocked with rotation of said reel shaft means, said belt take-up force locking mechanism being adapted, when it assumes said operative condition, to move from and towards its initial operative position in response to rotation of said reel shaft means in the belt draw-out direction and in the belt take-up direction, respectively, and having cam means for preventing rotation of said reel shaft means in the belt take-up direction when said take-up force locking mechanism is in its initial operative position.

3. A retractor according to claim 2, wherein said emergency-locking mechanism prevents rotation of said reel shaft means in the belt draw-out direction by said second means moving axially inwardly along a shaft of said reel shaft means and meshing with locking means of said base member formed around a bearing portion of said base member for said reel shaft means to connect said reel shaft means to said base member, and the phase relationship between said second means and said locking means is so set that the second means cannot mesh with said locking means if said second means moves axially inwardly of said shaft when said take-up force locking mechanism is in its initial operative position and is interlocked with said reel shaft means.

* * * * *